(12) United States Patent
Abe (10) Patent No.: US 6,882,752 B1
(45) Date of Patent: Apr. 19, 2005

(54) IMAGE COMPRESSION AND EXPANSION APPARATUS AND PIXEL NUMBER INCREASING APPARATUS

(75) Inventor: Nobuaki Abe, Hokkaido (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/488,677

(22) Filed: Jan. 21, 2000

(30) Foreign Application Priority Data

Jan. 22, 1999 (JP) ........................................ P11-014143

(51) Int. Cl.[7] .................................................. G06K 9/36
(52) U.S. Cl. ..................................... 382/250; 382/299
(58) Field of Search ................................ 382/242–252; 375/240–241

(56) References Cited

U.S. PATENT DOCUMENTS

| | | | | |
|---|---|---|---|---|
| 5,159,468 A | * | 10/1992 | Yoshida et al. | 358/451 |
| 5,216,516 A | * | 6/1993 | Tanaka et al. | 382/246 |
| 5,666,209 A | | 9/1997 | Abe | |
| 5,689,612 A | | 11/1997 | Abe | |
| 5,845,015 A | * | 12/1998 | Martucci | 382/250 |
| 5,875,039 A | * | 2/1999 | Ohsawa et al. | 382/232 |
| 6,426,974 B2 | * | 7/2002 | Takahashi et al. | 375/240.03 |
| 6,473,207 B1 | * | 10/2002 | Miyamoto | 358/539 |

FOREIGN PATENT DOCUMENTS

JP          407044699 A   *   2/1995   .............. G06T/3/40

* cited by examiner

*Primary Examiner*—Jingge Wu
(74) *Attorney, Agent, or Firm*—Greenblum & Bernstein, P.L.C.

(57) ABSTRACT

An image compression and expansion apparatus reproduces an expanded image corresponding to an original image from a reduced image. The original image data is comprised of approximately 1000×600 pixel values Pyx. A first matrix M1 comprised of 64×64 pixel values Pyx is extracted from the original image data. Regarding the original image data arranged in the first matrix M1, an average value of 8×8 pixel values Pyx forming a block B1 is obtained, and thus a second matrix M2 is generated using the average value as a single pixel value. The pixel values of the second matrix M2 is subject to two dimensional discrete cosine transformation to obtain a matrix MD comprised of 8×8 DCT coefficients. Expanded two dimensional inverse discrete cosine transformation is applied to the matrix MD to obtain a third matrix M3 comprised of 64×64 pixel values. The expanded image data comprising the third matrix M3 is transformed to the same coordinate system as the original image data and recorded on to the recording medium.

11 Claims, 9 Drawing Sheets

IMAGE COMPRESSION AND EXPANSION APPARATUS AND PIXEL NUMBER INCREASING APPARATUS

BACKGROUND OF THE INVENTION

1. Field of the Invention

The present invention relates to an image compression and expansion apparatus for recording image data obtained by reducing the number of pixels of an original still image on to a recording medium and later reading the image data from the recording medium and restoring the original image.

2. Description of the Related Art

In the past, as an example of image compression processing in an image compression and expansion apparatus, it has been known to find an average value of a predetermined number of pixel values included in the large number of pixels forming an original image, to generate a single pixel and to record a reduced image comprised of such pixels on to a recording medium. Further, in the image expansion processing in the image compression and expansion apparatus, the reduced image read from the recording medium is subject to interpolation so as to generate an enlarged image of the same number of pixels as the original image.

On the other hand, another image compression and expansion apparatus is known to record DCT coefficients obtained by application of a two dimensional discrete cosine transformation to a reduced image on to a recording medium and apply a two dimensional inverse discrete cosine transformation to the DCT coefficients read from the recording medium to obtain IDCT coefficients. The IDCT coefficients correspond to part of the pixels contained in the pixels of the original image. By applying interpolation to the IDCT coefficients, it is possible to generate an enlarged image of the same number of pixels as the original image.

The enlarged image reproduced by an image compression and expansion apparatus should ideally match the original image, but since part of the information included in the original image is lost at the time of generating the reduced image, normally the original image is not matched and the quality of the image becomes relatively poor.

SUMMARY OF THE INVENTION

An object of the present invention is to provide an image compression and expansion apparatus for reproducing an expanded image corresponding to an original image from a reduced image, which can improve the quality of the expanded image.

According to a first aspect of the present invention, there is provided an image compression and expansion apparatus comprising a reduced image generating processor, a reduced image recording processor, an orthogonal transforming processor and an expanded image generating processor.

The reduced image generating processor generates, based on original image data arranged in a first matrix comprised of a plurality of pixels, reduced image data arranged in a second matrix comprised of a smaller number of pixels than the first matrix. The reduced image recording processor records the reduced image data in a recording medium. The orthogonal transforming processor reads the reduced image data from the recording medium and applies orthogonal transformation to obtain orthogonal transformation coefficients arranged in the second matrix. The expanded image generating processor applies inverse orthogonal transformation to the orthogonal transformation coefficients to obtain expanded image data arranged in a third matrix comprised of a greater number of pixels than the second matrix.

According to a second aspect of the present invention, there is provided an image compression and expansion apparatus comprising a reduced image generating processor, a reduced orthogonal transformation coefficient data recording processor and an expanded image generating processor.

The reduced image generating processor generates, based on original image data arranged in a first matrix comprised of a plurality of pixels, reduced image data arranged in a second matrix comprised of a smaller number of pixels than the first matrix. The reduced image recording processor records reduced orthogonal transformation coefficient data obtained by orthogonal transformation of the reduced image data, in a recording medium. The expanded image generating processor reads the reduced orthogonal transformation coefficient data from the recording medium and applies inverse orthogonal transformation to obtain expanded image data arranged in a third matrix comprised of a greater number of pixels than the second matrix.

According to a third aspect of the present invention, there is provided a pixel number increasing apparatus comprising an orthogonal transforming processor and an expanded image generating processor.

The orthogonal transforming processor applies orthogonal transformation to image data arranged in a fourth matrix comprised of a plurality of pixels to obtain orthogonal transformation coefficients of image data arranged in the fourth matrix. The expanded image generating processor applies inverse orthogonal transformation to the orthogonal transformation coefficients to obtain expanded image data arranged in a fifth matrix comprised of a greater number of pixels than the fourth matrix.

According to a fourth aspect of the present invention, there is provided a pixel number increasing apparatus comprising an expanded image generating processor that applies inverse orthogonal transformation to image data arranged in a sixth matrix comprised of a plurality of orthogonal transformation coefficients to obtain expanded image data arranged in a seventh matrix comprised of a greater number of pixels than the sixth matrix.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

The present invention will be described below with reference to embodiments shown in the drawings.

Figure 1:
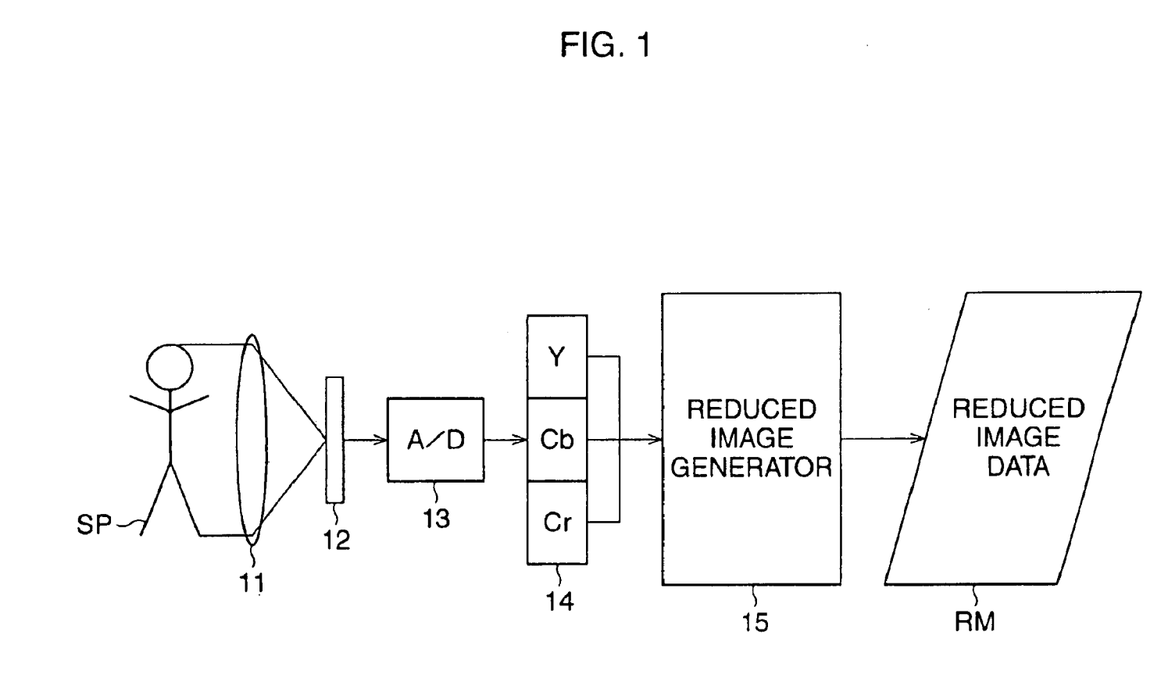
FIG. 1 is a block diagram of an image compression apparatus included in the image compression and expansion apparatus according to a first embodiment of the present invention.
Figure 2:
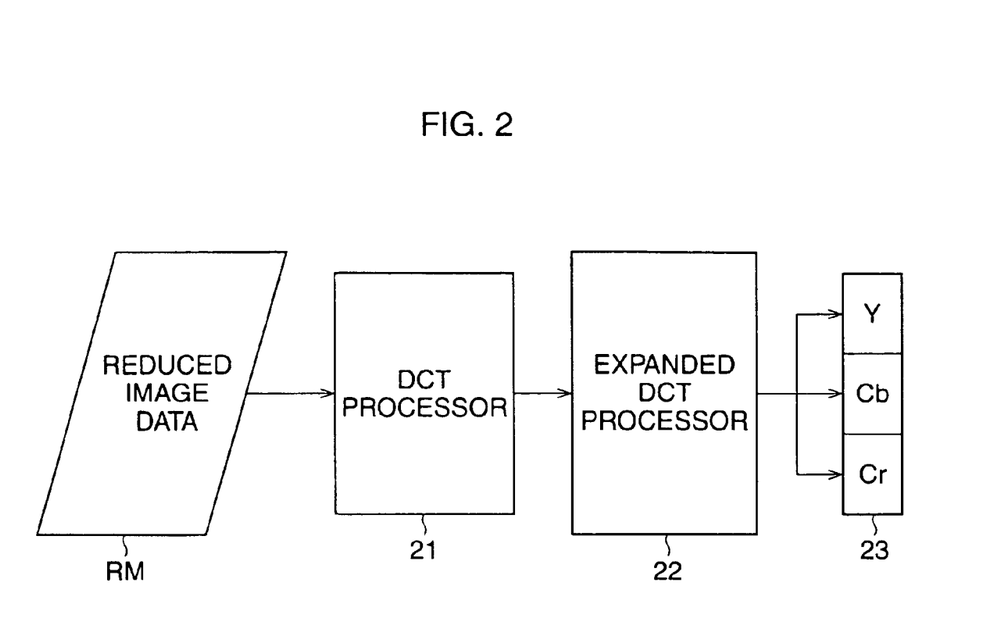
FIG. 2 is a block diagram of an image expansion apparatus included in the image compression and expansion apparatus according to the first embodiment of the present invention.

FIGS. 1 and 2 are block diagrams of an image compression and expansion apparatus according to a first embodiment of the present invention. FIG. 1 shows an image compression apparatus, while FIG. 2 shows an image expansion apparatus.

Light reflected from a subject being photographed SP is focused by a photographing optical system 11, whereby an optical image of the subject SP is formed on the light receiving surface of an imaging device 12. At the light receiving surface of the imaging device 12 are provided red (R), green (G), and blue (B) color filters. The imaging device 12 generates analog electrical signals corresponding to the R, G, and B images. These electrical signals are converted to digital electrical signals of the R, G, and B images at an AD converter 13. The R, G, and B image signals are converted to luminance data Y and color difference data Cb, Cr at a not shown image processing circuit and stored in a memory 14.

The luminance data Y and color difference data Cb, Cr are original image data comprised of approximately 1000 pixels in the horizontal direction and approximately 600 pixels in the vertical direction in the image arranged in a matrix. As described later, in a reduced image generator 15, image data is extracted from the original image data for every first matrix comprised of 64×64 pixels and the original image data of the first matrix is reduced. In the reduction processing, the original image data is converted to reduced image data comprised by a second matrix. The second matrix is comprised of a smaller number of pixels than the first matrix. That is, the reduced image data is compressed from the luminance data Y and the color difference data Cb, Cr stored in the first memory 14. The compression rate is for example 1/64. The reduced image data is recorded in a recording medium RM such as an IC memory card.

The reduced image data corresponding to the luminance data Y and the color difference data Cb, Cr is read from the recording medium RM and subjected to a two dimensional discrete cosine transformation (DCT) at the DCT processor 21. That is, the reduced image data is converted to DCT coefficients. These DCT coefficients are subjected to the later described expanded two dimensional inverse discrete cosine transformation (expanded IDCT) at an expanded IDCT processor 22. Due to this, expanded image data comprised of a third matrix is obtained and stored in the second memory 23. The expanded image data corresponds to the original image data and is of the format of luminance data Y and color difference data Cb, Cr. Further, the third matrix is comprised of the greater number of pixels than the second matrix. The number of pixels is the same as that of the first matrix.

Figure 3:
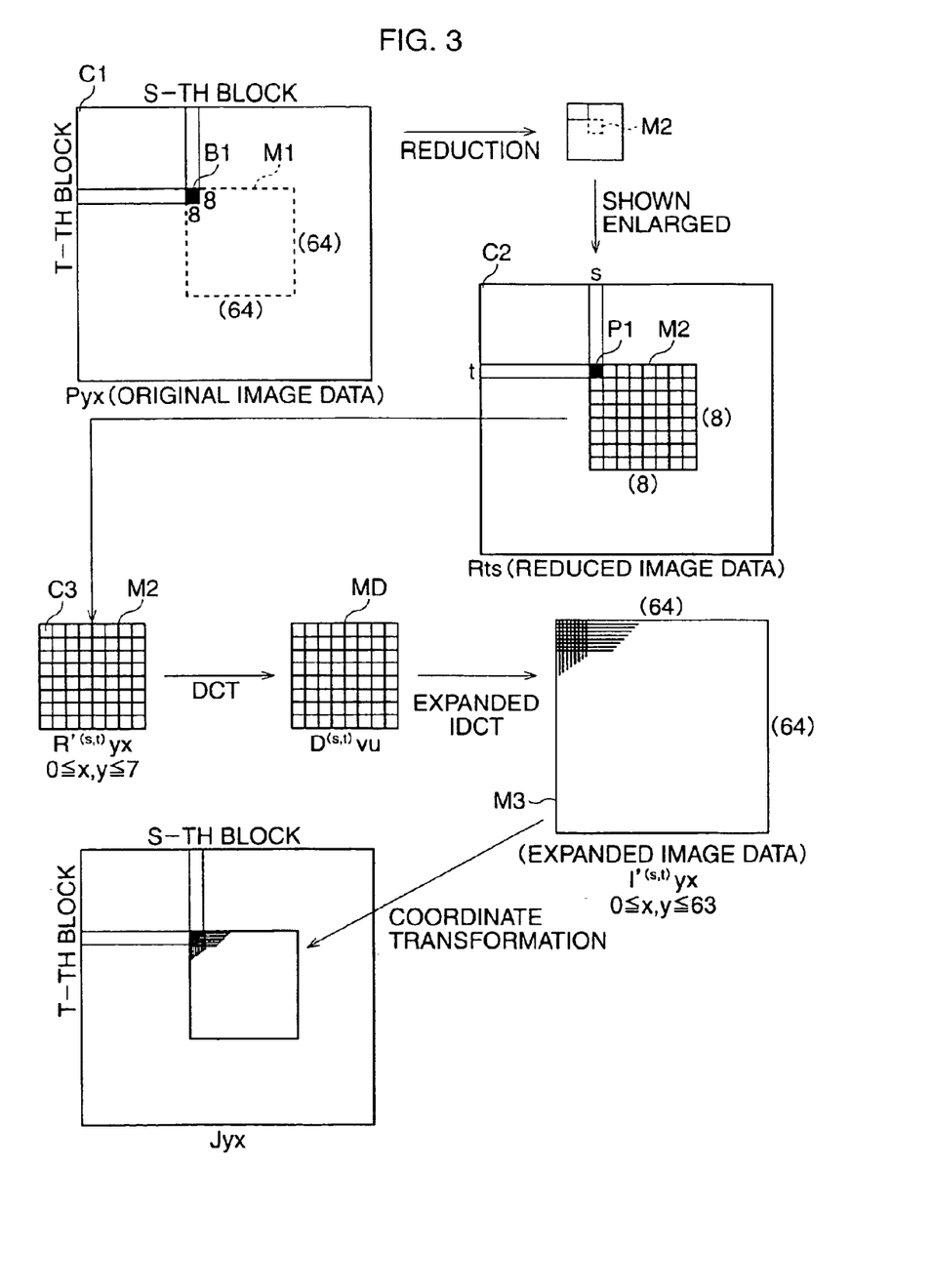
FIG. 3 is a view of matrixes of image data processed in the image compression and expansion apparatus shown in FIG. 1 and FIG. 2.
Figure 4:
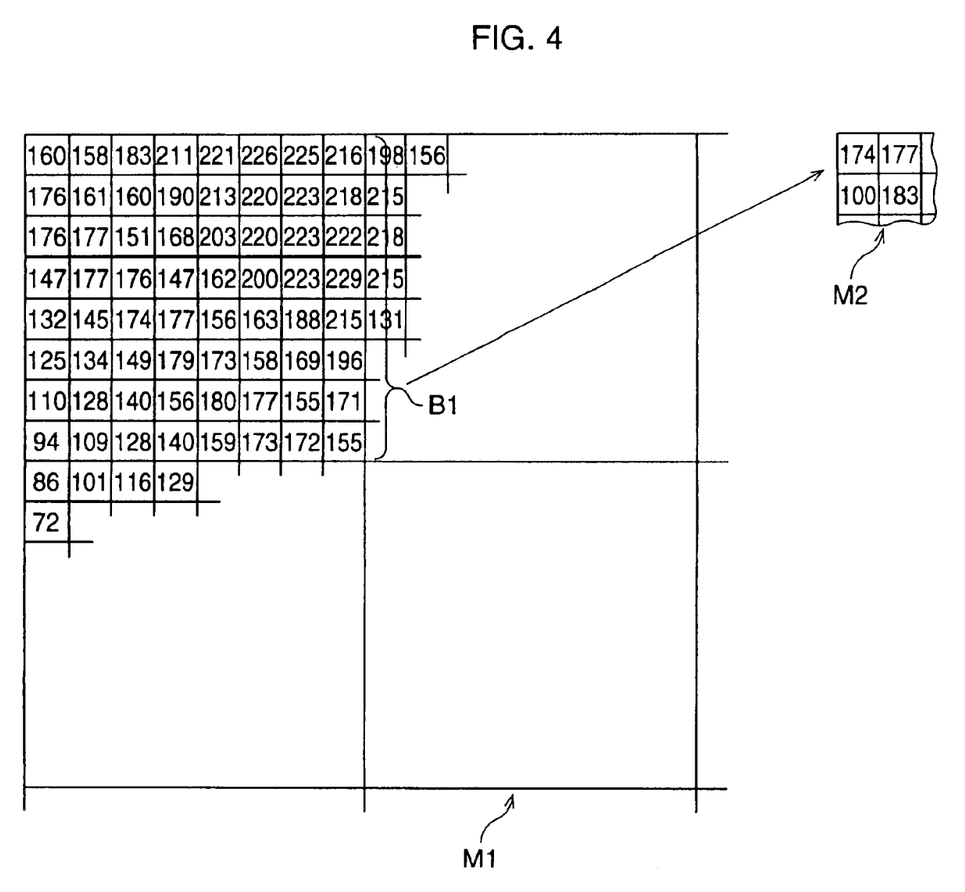
FIG. 4 is a view of the reduction processing in a reduced image generator.

FIG. 3 is a view of matrixes of image data processed in the image compression and expansion apparatus shown in FIG. 1 and FIG. 2. FIG. 4 is a view of reduction processing in the reduced image generator 15. An explanation will be made next of the operation of the reduced image generator 15 referring to FIG. 3 and FIG. 4.

The original image data is comprised of approximately 1000×600 pixel values Pyx and is divided into unit blocks comprised of 8×8 pixels. In FIG. 3, the block B1 has the left corner block of the original image data as its origin and is positioned at the s-th block in the horizontal direction and the t-th block in the vertical direction. The first matrix M1 is comprised by 64 unit blocks comprising 8 blocks in the horizontal direction and 8 in the vertical direction. That is, the first matrix M1 is comprised of 64×64 pixel values Pyx.

In the reduced image generator 15, a second matrix M2 is generated for every original image data comprised of a first matrix M1. The pixel value Rts in the second matrix M2 is shown by the following formula (2). That is, the pixel value Rts of the second matrix M2 is obtained by finding the average value of 8×8 pixel values Pyx comprising the block B1 in the first matrix M1:

$$Rts = \left( \sum_{x=sx8}^{sx8+7} \sum_{y=tx8}^{tx8+7} Pyx \right) / 64 \qquad (2)$$

The origin in the original pixel data is the pixel of the left corner C1 of the image. x shows the coordinate of the pixel in the horizontal direction, while y is the coordinate of the pixel in the vertical direction.

In the example shown in FIG. 4, the block B1 included in the first matrix M1 is comprised of the 64 pixel values Pyx of 160, 158, 183, 211, 221, 226 . . . The average value 174 of the 64 pixel values Pyx is found as the corresponding pixel value Rts of the second matrix M2.

In this way, the second matrix M2 is comprised of 8×8 pixel values. The reduced image data comprised of the second matrix M2 shows the original image by fewer pixels than the original image data. In other words, the block B1 positioned at the s-th block in the horizontal direction of the original image data and the t-th block in the vertical direction corresponds to the pixel P1 positioned at the s-th pixel in the horizontal direction of the reduced image data and the t-th pixel in the vertical direction.

Figure 5:
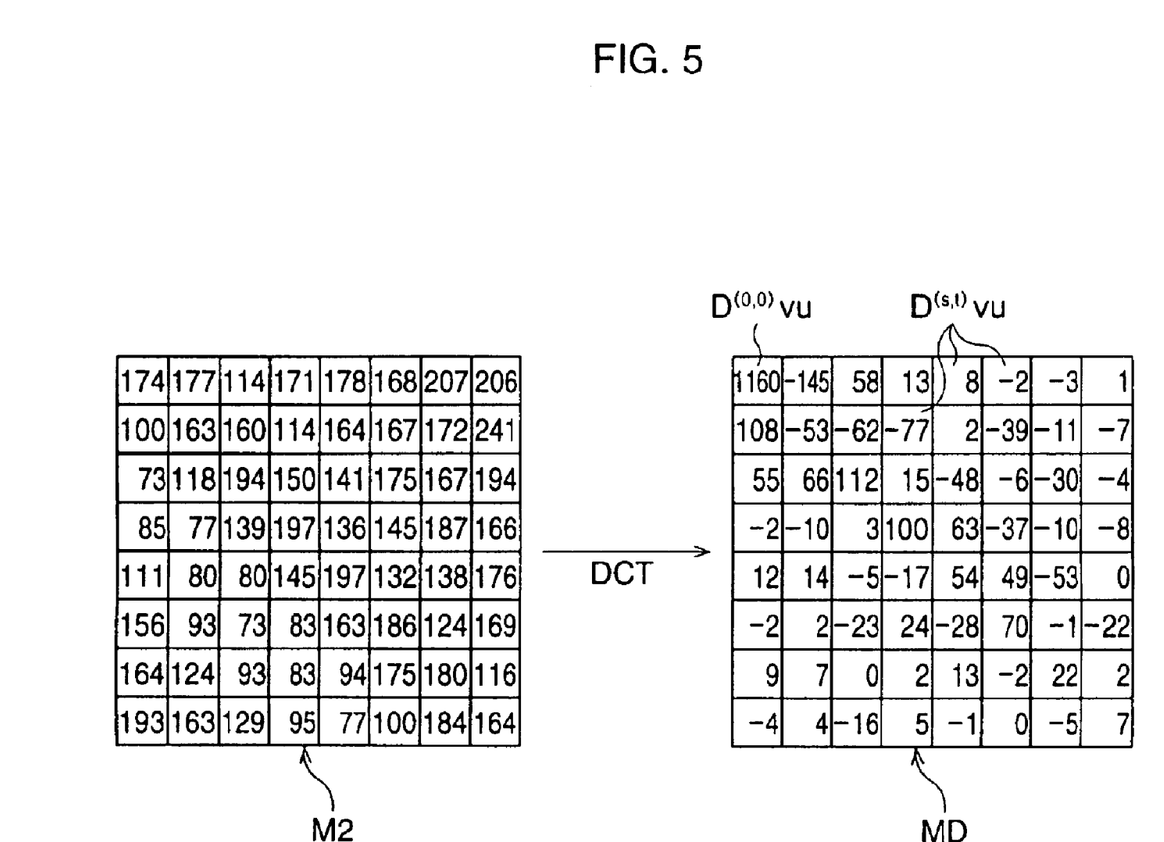
FIG. 5 is a view of 8×8 pixel values of a second matrix and DCT coefficients corresponding to the image data comprised of the pixel values.

FIG. 5 shows the 8×8 pixel values of the second matrix M2 and the DCT coefficients of these pixel values. In the reduced image data read from the recording medium RM, the pixel value Rts, which is a component of the second matrix M2, is shown by an (s,t) coordinate system having the left corner C2 in the reduced image data as an origin. For the DCT, the pixel value Rts is converted to a coordinate system having the left corner C3 in the second matrix M2 as an origin in accordance with formula (3):

$$R'^{(s,t)}_{yx} = R_{t+y,x+x} \text{ where, } 0 \le x, y \le 7 \qquad (3)$$

The DCT is performed in accordance with the following formula (4) at the DCT processor 21:

$$D^{(s,t)}_{vu} = \frac{1}{4} CuCv \sum_{x=0}^{7} \sum_{y=0}^{7} R'^{(s,t)}_{yx} \cdot \cos\frac{(2x+1)u\pi}{16} \cos\frac{(2y+1)v\pi}{16} \qquad (4)$$

where, $Cu, Cv = 1/\sqrt{2} : u, v = 0 \ Cu, Cv = 1 : u, v \ne 0$

In the matrix MD comprised of the DCT coefficients $D^{(s,t)}vu$ obtained by the DCT, the DCT coefficient $D^{(0,0)}$ at the origin (0,0) is the direct current (DC) component while the remaining 63 DCT coefficients $D^{(s,t)}vu$ are alternating current (AC) components. The DC component corresponds to the average value of the 8×8 pixel values comprising the second matrix, while the AC components correspond to the predetermined spatial frequency components.

The expanded IDCT performed at the expanded IDCT processor 22 is described below.

Here, for simplification of the description, the case where the matrix of the image data is arranged one-dimensionally, that is, one dimensional expanded IDCT, will be explained.

The one dimensional discrete cosine transformation (one dimensional DCT) on the image data comprised of 8 pixels Px (=$P_0$, $P_1$, $P_2$, . . . P) arranged one-dimensionally is expressed by the following formula (5):

$$F(u) = \frac{1}{2}Cu\sum_{x=0}^{7} Px\cos\frac{(2x+1)u\pi}{16} \text{ where,} \quad (5)$$

$$Cu = \frac{1}{\sqrt{2}}: u = 0$$

$$Cu = 1: u \neq 0$$

As can be understood from formula (5), a spatial frequency component F(u) is obtained based on the pixel values Px at the 8 regions x by a one dimensional discrete cosine transformation. The number of types of spatial frequencies (i.e., the number of "u's") is equal to the number of regions x and is 8 in the case where the number of regions x is 8. That is, in this case, the DC component F(O) and the seven AC components F(1), F(2), . . . F(7) are obtained.

The one dimensional inverse discrete cosine transformation (one dimensional IDCT) is expressed by the following formula (6):

$$P'x = \frac{1}{2}\sum_{u=0}^{7} CuF(u)\cos\frac{(2x+1)u\pi}{16} \quad (6)$$

As can be understood from formula (6), a pixel value P'x is obtained based on the 8 spatial frequency components F(u) by the one dimensional inverse discrete cosine transformation.

Figure 6:
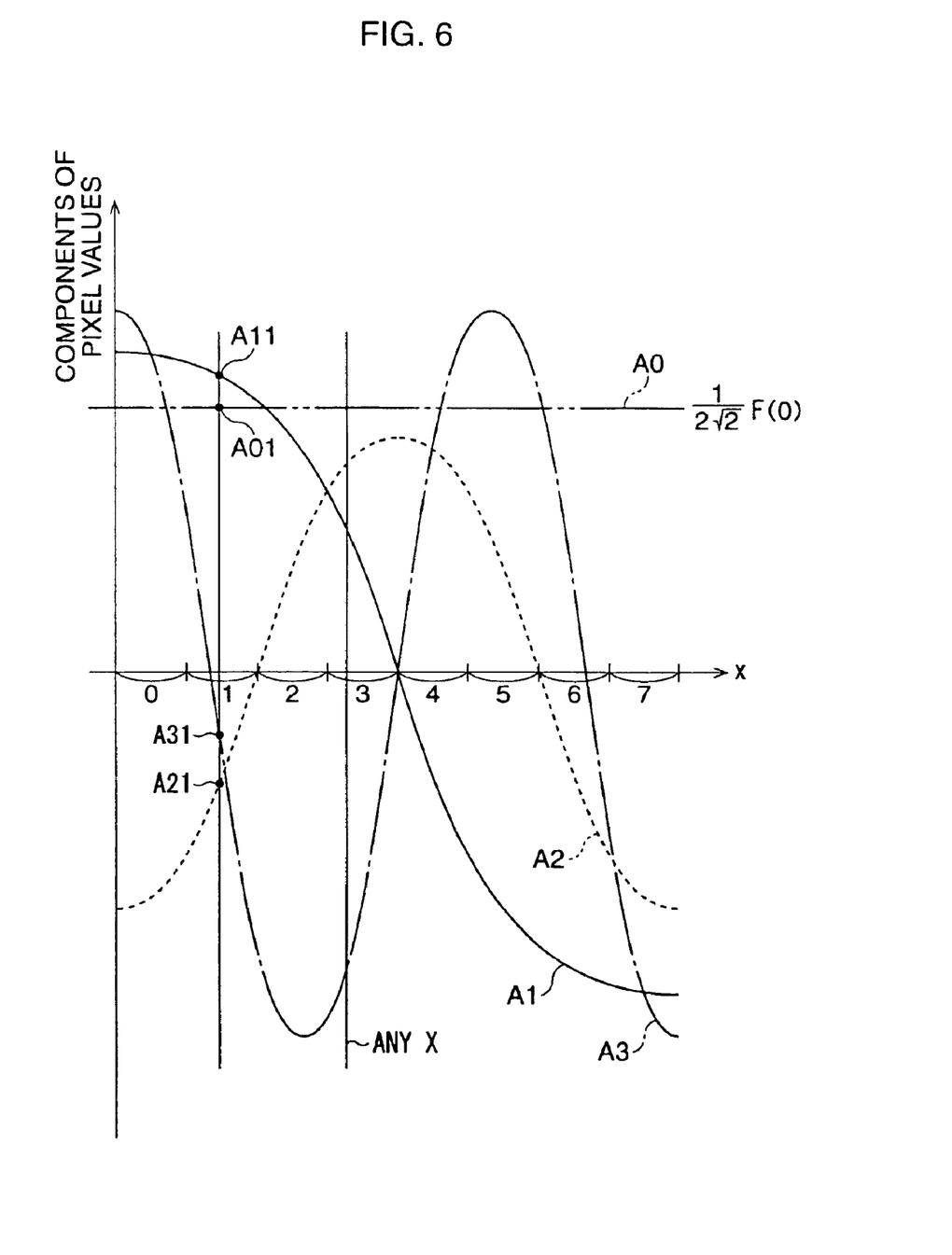
FIG. 6 is a view of the component relating to the DC component F(O) in the pixel value and the components relating to the AC components F(1), F(2), and F(3)

FIG. 6 shows the component relating to the DC component F(0) and the components relating to the AC components F(1), F(2), and F(3) in a pixel value P'x. The component A0 of the pixel value P'x relating to the DC component F(0) is expressed by:

$$\frac{1}{2\sqrt{2}}F(0)$$

The component A1 of the pixel value P'x relating to the AC component F(1) is expressed by:

$$\frac{1}{2}F(1)\cos\frac{(2x+1)\pi}{16}$$

The component A2 of the pixel value P'x relating to the AC component F(2) is expressed by:

$$\frac{1}{2}F(2)\cos\frac{2(2x+1)\pi}{16}$$

The component A3 of the pixel value P'x relating to the AC component F(3) is expressed by:

$$\frac{1}{2}F(3)\cos\frac{3(2x+1)\pi}{16}$$

A pixel value P'x is the sum of the components of the pixel value P'x relating to all of the spatial frequency components F(0), F(1), F(2), . . . F(7). For example, the pixel value at x=1 is expressed by the following formula (7):

$$P'_1 = \frac{1}{2}\sum_{u=0}^{7} CuF(u)\cos\frac{3u\pi}{16} \quad (7)$$

where, $Cu = \frac{1}{\sqrt{2}}: u = 0 \ Cu = 1: u \neq 0$

In FIG. 6, the components A01, A11, A21, and A31 of the pixel values relating to the spatial frequency components F(0), F(1), F(2), and F(3) in formula (7) are indicated.

Using the same technique as when obtaining the pixel value P'i at x=1, that is, by interpolation at the curves of the components A0, A1, A2, A3 . . . (see FIG. 6) of the pixel value P'x relating to the spatial frequency components F(0), F(1), . . . F(7), it is possible to obtain the pixel values P'x at any region x. For example, the pixel values, when dividing the range 0 to 7 of the region x of the pixels equally by 64, that is, relating to x=0, 0.125, 0.25, 0.375, 0.5, 0.625, . . . 6.875, and 7.0, are obtained by formula (8):

$$P'x = \frac{1}{2}\sum_{u=0}^{7} CuF(u)\cos\frac{(2x+1)u\pi}{128} \quad (8)$$

Note that in formula (8), the denominator of the cosine was made 128 so as to handle the regions x as integer numbers.

Further finely dividing the range of the regions x and performing inverse discrete cosine transformation in this way is called "expanded IDCT" in this specification. The expanded IDCT can also be applied to two dimensional array image data in the same way as the case of such one dimensional array image data. Formula (9) shows a formula for performing the expanded IDCT in the case of a two dimensional array and obtaining the image values I'$_{(s,t)}$yx.

$$I'^{(s,t)}_{yx} = \frac{1}{4}\sum_{u=0}^{7}\sum_{v=0}^{7} CuCvD^{(s,t)}_{vu} \cdot \cos\frac{(2x+1)u\Pi}{128}\cos\frac{(2y+1)v\Pi}{128} \dots \quad (9)$$

where, $0 \leq x \leq 63, 0 \leq y \leq 63$.

Figure 7:
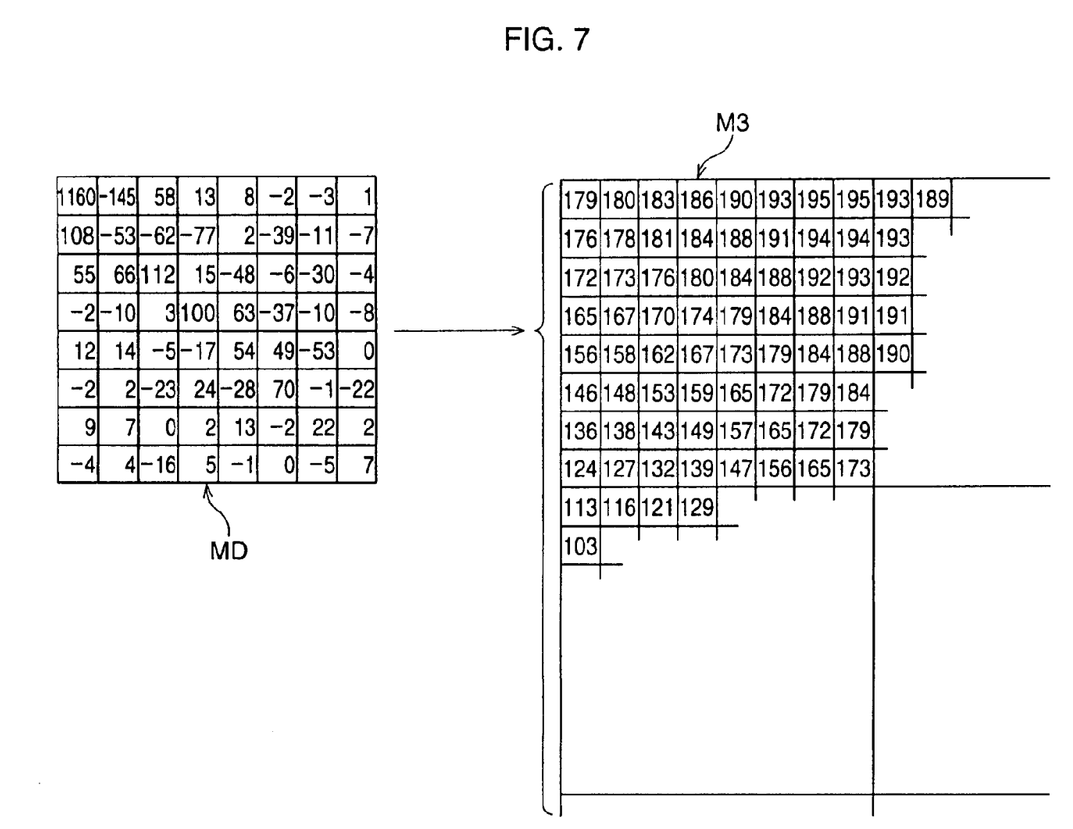
FIG. 7 is a view of the DCT coefficients of an 8×8 matrix and the pixel values comprising a third matrix of reproduced image data.

According to the expanded IDCT shown in formula (9), the 8×8 DCT coefficients D$^{(s,t)}$vu comprising the matrix MD, as shown in FIG. 7, are transformed into a third matrix M3 comprised of 64×64 pixel values I'$^{(s,t)}$yx. The third matrix M3 forms the expanded image data as described above.

The coordinates (x,y) of a pixel value I'$^{(s,t)}$yx in the third matrix M3 are based on the pixel of the left corner as the origin in the same way as the second matrix M2. Therefore, to return a pixel value I'$^{(s,t)}$yx of the third matrix M3 to the same coordinate system as the original image data, coordinate transformation is performed in accordance with formula (10) and the coordinate transformed enlarged image data is stored in the second memory 23 (see FIG. 1).

$$J_{tx8+y, ax8+y} = I'_{yx}{}^{(s,t)} \quad (10)$$

As can be understood from formula (10), the coordinates of a pixel value I'$^{(s,t)}$yx in the expanded image data are obtained from the position (s,t) of the block B1 (see FIG. 3) corresponding to the third matrix M3 and the position (s-th block, t-th block) of the pixel value I'$^{(s,t)}$yx in the third matrix M3.

As explained above, according to the present embodiment, by applying DCT and expanded IDCT to the reduced image data, it is possible to obtain expanded image data (expanded image) of the same size and the same number of pixels as the original image data. In the expanded IDCT, as shown by formula (9), the pixel values of the expanded image data are obtained by applying the two dimensional inverse discrete cosine transformation directly to the result obtained by the DCT to generate each of the elements forming the third matrix M3. Therefore, according to the present embodiment, despite the loss of information at the time of generating reduced image data, it becomes possible to reproduce an image close to the original image and improve the quality of the reproduced expanded image.

Note that the number of pixels forming the second and third matrixes M2 and M3 can be freely set. That is, when making n1, m1, n2, m2, N, and M positive integers, the second matrix is comprised of n1×m1 pixels and the third matrix is comprised of n2×m2 pixels. Here, n2 is $2^N$ times n1 and m2 is $2^M$ times m1.

In this embodiment, the number of pixels is reduced from the original image data to generate reduced image data, then the number of pixels is increased by the expanded IDCT to generate enlarged image data, but the reduced, image data can be deemed original image data. That is, first, the two dimensional discrete cosine transformation is applied to the original image data comprised of the fourth matrix (corresponding to the second matrix M2) comprised of, for example, 8×8 pixels so as to obtain the DCT coefficients of the original image data. Further, the expanded IDCT is applied to the DCT coefficients to obtain expanded image data comprised of a fifth matrix (corresponding to the third matrix M3) comprised of, for example, 64×64 pixels. By this configuration, it becomes possible to increase the number of pixels of original image data comprised by the fourth matrix to improve the quality of the reproduced image.

Figure 8:
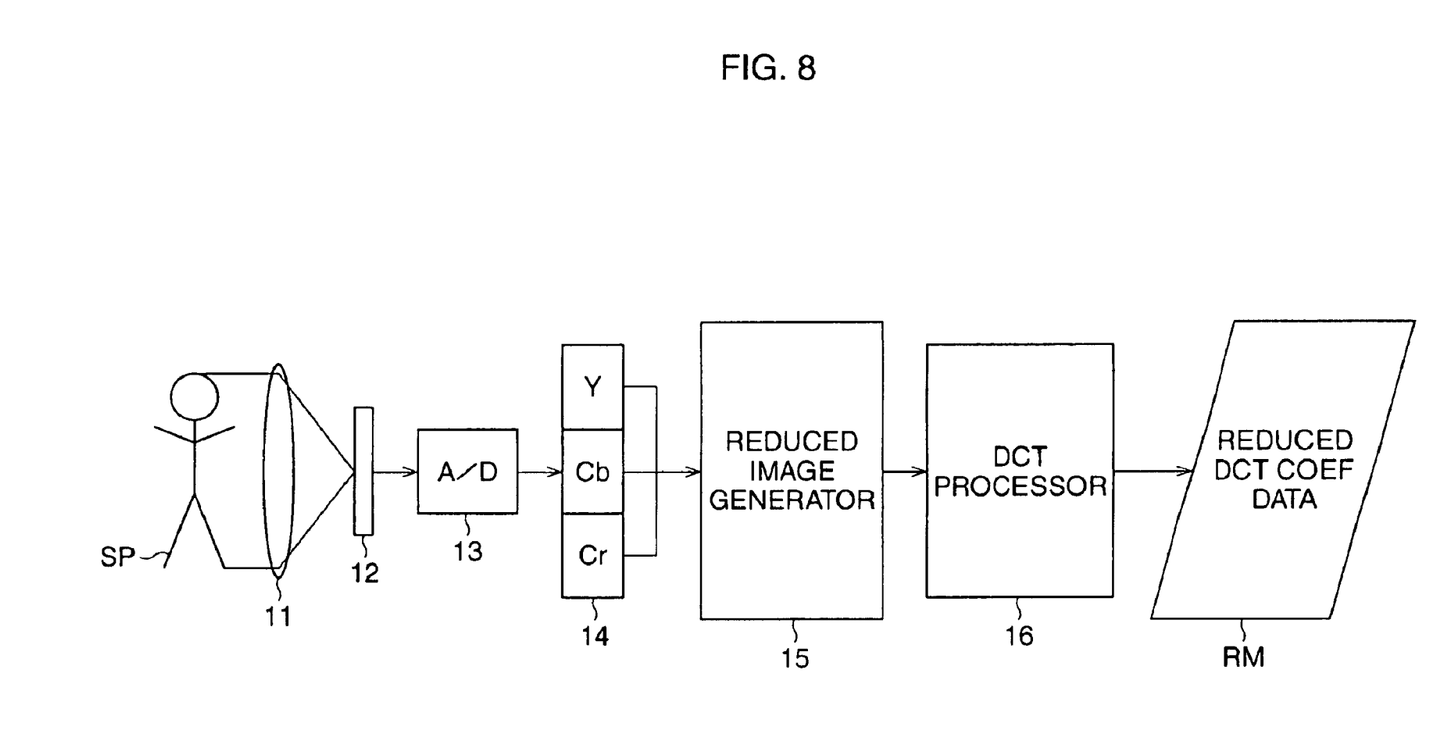
FIG. 8 is a block diagram of an image compression apparatus included in the image compression and expansion apparatus according to a second embodiment of the present invention.
Figure 9:
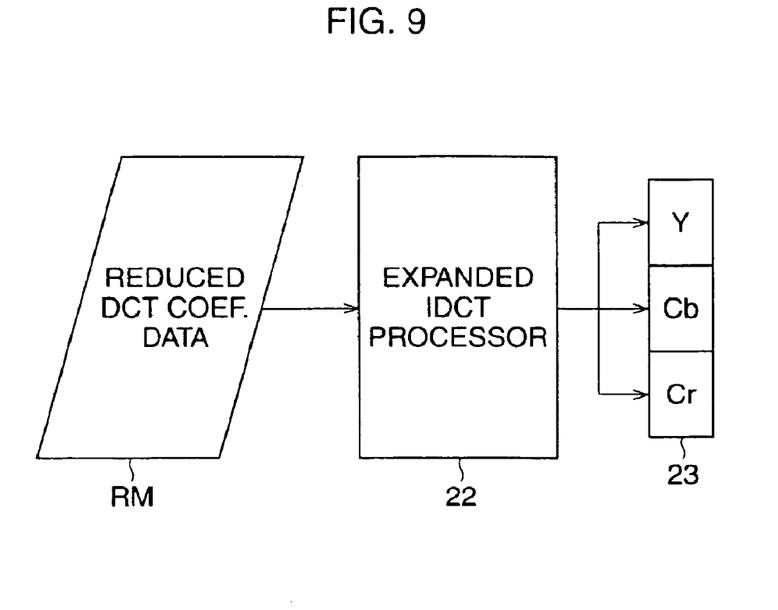
FIG. 9 is a block diagram of an image expansion apparatus included in the image compression and expansion apparatus according to the second embodiment of the present invention.

FIG. 8 and FIG. 9 are block diagrams showing an image compression and expansion apparatus according to a second embodiment. FIG. 8 shows an image compression apparatus, while FIG. 9 shows an image expansion apparatus. The same reference numerals are used for components the same as or equivalent to the first embodiment shown in FIG. 1 and FIG. 2.

Components different from those of the first embodiment will be described. The reduced image data comprised of the second matrix M2 (see FIG. 3) comprised of 8×8 pixels generated in the reduced image generator 15 is subject to the two dimensional discrete cosine transformation at the DCT processor 16. The number of elements of the matrix MD (see FIG. 3) obtained by this, that is, the number of DCT coefficients, is 8×8. This is less than the first matrix M1 (see FIG. 3) forming the original image data. The matrix MD forms the reduced DCT coefficient data. The reduced DCT coefficient data is recorded on the recording medium RM.

The reduced DCT coefficient data is read from the recording medium RM and the expanded two dimensional inverse discrete cosine transformation is applied at the expanded IDCT processor 22. Due to this, enlarged image data comprised of a third matrix M3 (see FIG. 3) is obtained. That is, in the second embodiment, since reduced DCT coefficient data comprised of DCT coefficients is recorded on the recording medium RM, no DCT processor is provided before the enlarged IDCT processor 22.

The rest of the configuration and mode of operation are the same as those of the first embodiment.

Note that in the second embodiment as well, it is possible to view the reduced DCT coefficient data as the original image data and apply expanded IDCT to it so as to increase the number of pixels. That is, first, expanded IDCT is applied to the DCT coefficients of original image comprised of a sixth matrix (corresponding to matrix MD) comprised of, for example, 8×8 DCT coefficients to obtain enlarged image data comprised of a seventh matrix (corresponding to third matrix M3) comprised of, for example, 64×64 pixels. In this configuration as well, it is possible to increase the number of pixels of original image data comprised of the sixth matrix and improve the quality of the reproduced image.

In the above embodiments, the two dimensional discrete cosine transformation was used for the orthogonal transformation and the two dimensional inverse discrete cosine transformation was used for the inverse orthogonal transformation, but the invention is not limited to this. It is also possible to use another known orthogonal transformation and inverse orthogonal transformation.

As described above, according to the present invention, it becomes possible to provide an image compression and expansion apparatus for generating an enlarged image corresponding to an original image from a reduced image, which can improve the quality of the enlarged image.

While the invention has been described with reference to specific embodiment chosen for purpose of illustration, it should be apparent that numerous modifications could be made thereto by those skilled in the art without departing from the basic concept and scope of the invention.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 11-14143 (filed on Jan. 22, 1999) which is expressly incorporated herein, by reference, in its entirety.

What is claimed is:

1. An image compression and expansion apparatus, comprising:

a reduced image generating processor that generates, based on original image data arranged in a first matrix comprised of a plurality of pixels, reduced image data arranged in a second matrix comprised of a smaller number of pixels than said first matrix;

a reduced image recording processor that records said reduced image data in a recording medium;

an orthogonal transforming processor that reads said reduced image data from said recording medium and applies an orthogonal transformation to obtain orthogonal transformation coefficients arranged in said second matrix; and an expanded image generating processor that applies an inverse orthogonal transformation to all of said orthogonal transformation coefficients to obtain expanded image data arranged in a third matrix having a greater number of pixels than said second matrix, wherein said reduced image generating processor obtains an average value of a predetermined number of pixel values included in said first matrix, and sets said average value as one pixel value corresponding to a predetermined number of pixels included in said second matrix.

2. The image compression and expansion apparatus according to claim 1, wherein said second and third matrixes are comprised of n1×m1 and n2×m2 pixels, respectively, and n2 and m2 are $2^N$ times n1 and $2^M$ times m1, respectively (where n1, m1, n2, m2, N and M are positive integers).

3. The image compression and expansion apparatus according to claim 1, wherein said first matrix is comprised of 64×64 pixels and said second matrix is comprised of 8×8 pixels.

4. The image compression and expansion apparatus according to claim 1, wherein the numbers of pixels contained in said first and third matrixes are the same.

5. The image compression and expansion apparatus according to claim 1, wherein said first and third matrixes are each comprised of 64×64 pixels.

6. The image compression and expansion apparatus according to claim 1, wherein said orthogonal transformation comprises a two dimensional discrete cosine transformation and said inverse orthogonal transformation comprises a two dimensional inverse discrete cosine transformation.

7. An image compression and expansion apparatus, comprising:
a reduced image generating processor that generates, based on original image data arranged in a first matrix comprised of a plurality of pixels, reduced image data arranged in a second matrix comprised of a smaller number of pixels than said first matrix;
a reduced orthogonal transformation coefficient data recording processor that records reduced orthogonal transformation coefficient data, obtained by orthogonal transformation of said reduced image data, in a recording medium; and
an expanded image generating processor that reads said reduced orthogonal transformation coefficient data from said recording medium and applies an inverse orthogonal transformation to all of said orthogonal transformation coefficients to obtain expanded image data arranged in a third matrix comprised of a greater number of pixels than said second matrix, wherein said reduced image generating processor obtains an average value of a predetermined number of pixel values included in said first matrix, and sets said average value as one pixel value corresponding to a predetermined number of pixels included in said second matrix.

8. The image compression and expansion apparatus according to claim 7, wherein said average value is obtained from 8×8 pixel values included in said first matrix.

9. An image compression and expansion apparatus, comprising:
a reduced image generating processor that generates, based on original image data arranged in a first matrix comprised of a plurality of pixels, reduced image data arranged in a second matrix comprised of a smaller number of pixels than said first matrix;
a reduced image recording processor that records said reduced image data in a recording medium;
an orthogonal transforming processor that reads said reduced image data from said recording medium and applies a two dimensional discrete cosine transformation to obtain orthogonal transformation coefficients arranged in said second matrix; and
an expanded image generating processor that applies a two dimensional inverse discrete cosine transformation to said orthogonal transformation coefficients to obtain expanded image data arranged in a third matrix comprised of a greater number of pixels than said second matrix, wherein said first, second, and third matrixes are comprised of 64×64, 8×8, and 64×64 pixels, respectively, and said expanded image generating processor obtains expanded image data by said two dimensional inverse discrete cosine transformation expressed by the following formula:

$$I'^{(s,t)}_{yx} = \frac{1}{4}\sum_{u=0}^{7}\sum_{v=0}^{7}CuCvD^{(s,t)}_{vu}\cdot\cos\frac{(2x+1)u\Pi}{128}\cos\frac{(2y+1)v\Pi}{128}$$

wherein, $0 \leq x \leq 63$, $0 \leq y \leq 63$, $I'_{yx}$ is the pixel value of expanded image data, $Cu$, $Cv = \frac{1}{2}^{1/2}$ when $u, v = 0$, $Cu$, $Cv = 1$ when $u, v \neq 0$, and $D_{vu}$ is a DCT coefficient obtained by said two dimensional discrete cosine transformation.

10. A pixel number increasing apparatus, comprising:
an orthogonal transforming processor that applies a two dimensional discrete cosine transformation to image data arranged in a first matrix comprised of a plurality of pixels to obtain orthogonal transformation coefficients of image data arranged in said first matrix; and
an expanded image generating processor that applies a two dimensional inverse discrete cosine transformation to said orthogonal transformation coefficients to obtain expanded image data arranged in a second matrix comprised of a greater number of pixels than said first matrix, wherein said first and second matrixes are comprised of 8×8 and 64×64 pixels, respectively, and said expanded image generating processor obtains expanded image data by said two dimensional inverse discrete cosine transformation expressed by the following formula:

$$I'^{(s,t)}_{yx} = \frac{1}{4}\sum_{u=0}^{7}\sum_{v=0}^{7}CuCvD^{(s,t)}_{vu}\cdot\cos\frac{(2x+1)u\Pi}{128}\cos\frac{(2y+1)v\Pi}{128}$$

wherein, $0 \leq x \leq 63$, $0 \leq y \leq 63$, $I'_{yx}$ is the pixel value of expanded image data, $Cu$, $Cv = \frac{1}{2}^{1/2}$ when $u, v = 0$, $Cu$, $Cv = 1$ when $u, v \neq 0$, and $D_{vu}$ is a DCT coefficient obtained by said two dimensional discrete cosine transformation.

11. A pixel number increasing apparatus, comprising an expanded image generating processor that applies a two dimensional inverse discrete cosine transformation to image data arranged in a first matrix comprised of a plurality of two dimensional discrete cosine transformation coefficients to obtain expanded image data arranged in a second matrix comprised of a greater number of pixels than said first matrix, wherein said first and second matrixes are comprised of 8×8 and 64×64 pixels, respectively, and said expanded image generating processor obtains expanded image data by said two dimensional inverse discrete cosine transformation expressed by the following formula:

$$I'^{(s,t)}_{yx} = \frac{1}{4}\sum_{u=0}^{7}\sum_{v=0}^{7}CuCvD^{(s,t)}_{vu}\cdot\cos\frac{(2x+1)u\Pi}{128}\cos\frac{(2y+1)v\Pi}{128}$$

wherein, $0 \leq x \leq 63$, $0 \leq y \leq 63$, $I'_{yx}$ is the pixel value of expanded image data, $Cu$, $Cv = \frac{1}{2}^{1/2}$ when $u, v = 0$, $Cu$, $Cv = 1$ when $u, v \neq 0$, and $D_{vu}$ is a DCT coefficient obtained by a two dimensional discrete cosine transformation.

* * * * *